United States Patent
Lin

(10) Patent No.: US 10,605,289 B2
(45) Date of Patent: Mar. 31, 2020

(54) SCREW WITH CUTTING TEETH

(71) Applicant: Fushang Co., Ltd., Kaohsiung (TW)

(72) Inventor: Jung-Nan Lin, Kaohsiung (TW)

(73) Assignee: Fushang Co., Ltd., Kaohsiung (TW)

( * ) Notice: Subject to any disclaimer, the term of this patent is extended or adjusted under 35 U.S.C. 154(b) by 329 days.

(21) Appl. No.: 15/693,760

(22) Filed: Sep. 1, 2017

(65) Prior Publication Data
US 2018/0266467 A1 Sep. 20, 2018

(30) Foreign Application Priority Data

Mar. 20, 2017 (TW) .............................. 106109139 A

(51) Int. Cl.
*F16B 25/10* (2006.01)
*F16B 25/00* (2006.01)

(52) U.S. Cl.
CPC ........ *F16B 25/103* (2013.01); *F16B 25/0015* (2013.01); *F16B 25/0026* (2013.01); *F16B 25/0084* (2013.01)

(58) Field of Classification Search
CPC .. F16B 25/00; F16B 25/0015; F16B 25/0057; F16B 25/0078; F16B 25/103
USPC ....................................... 411/411, 416, 387.2
See application file for complete search history.

(56) References Cited

U.S. PATENT DOCUMENTS

| 6,672,812 | B1 | 1/2004 | Lin | |
|---|---|---|---|---|
| 7,677,854 | B2 | 3/2010 | Langewiesche | |
| 2009/0028665 | A1* | 1/2009 | Chang | F16B 25/0015 411/387.3 |
| 2014/0314522 | A1 | 10/2014 | Lin | |
| 2014/0314523 | A1* | 10/2014 | Lin | F16B 25/0057 411/387.4 |
| 2017/0016468 | A1* | 1/2017 | Lin | F16B 25/0015 |
| 2017/0227039 | A1* | 8/2017 | Shih | F16B 25/0015 |

FOREIGN PATENT DOCUMENTS

| CN | 102165202 A | 8/2001 |
|---|---|---|
| TW | M283075 U | 12/2005 |
| TW | M327932 U | 3/2008 |
| TW | M469393 U | 1/2014 |

\* cited by examiner

*Primary Examiner* — Gary W Estremsky
(74) *Attorney, Agent, or Firm* — Alan D. Kamrath; Karin L. Williams; Mayer & Williams

(57) ABSTRACT

A screw includes a shank and at least one thread. The shank includes a front section, a rear section spaced from the front section along a longitudinal axis of the shank, and an intermediate section between the front and rear sections. A head is formed at an upper end of the rear section. The intermediate section has circular cross sections, and the front section has roughly triangular cross sections. A plurality of separate raised teeth is provided on a circumference of the front section, and each of the plurality of raised teeth extends along the longitudinal axis of the shank. The thread is spirally formed on the shank and includes a plurality of thread convolutions.

14 Claims, 10 Drawing Sheets

SCREW WITH CUTTING TEETH

BACKGROUND OF THE INVENTION

1. Field of the Invention

The present invention relates to a screw and, more particularly, to a screw with cutting teeth suitable for using in wood, cement workpieces or construction materials.

2. Description of the Related Art

A large amount of wood or compound wooden materials mixed and compressed from plastic resin and wood chips are used to produce wooden workpieces for furniture, decoration and construction, and screws are often used in connection between wooden workpieces. In general, a traditional screw includes a shank and at least one helical thread thereon by which the screw is driven into and coupled with two workpieces to be assembled. However, considerable frictional resistance, which is generated in the course of drilling and enlarging a hole, results in fractures of wooden workpieces easily when the traditional screw with the helical thread is difficulty driven into the hard wooden workpieces over a period of time. Moreover, it takes much time and consumes more strength to drive a screw into a hard cement workpiece.

BRIEF SUMMARY OF THE INVENTION

It is an objective of the present invention to provide a screw with cutting teeth which is used to drill and enlarge a hole in a workpiece smoothly so as to be driven into the workpiece fast and effortlessly.

To achieve this and other objectives, a screw with cutting teeth of the present invention includes a shank and a first thread. The shank includes a front section, a rear section spaced from the front section along a longitudinal axis of the shank, and an intermediate section between the front and rear sections. The intermediate section has circular cross sections, and the front section has roughly triangular cross sections and is provided with a plurality of separate raised teeth circumferentially. The first thread is spirally formed on the shank and includes a plurality of thread convolutions. A pitch is defined between two adjacent thread convolutions. The front section extends for at least two pitches along the longitudinal axis of the shank. Each tooth protrudes from the front section and is located between two adjacent thread convolutions, and each raised tooth extends for at least one pitch along the longitudinal axis of the shank.

In an embodiment, the front section includes an upper portion next to the intermediate section and a lower portion spaced from the upper portion along the longitudinal axis. The lower portion extends for at least one pitch along the longitudinal axis of the shank, and the raised teeth are provided on the lower portion of the front section. The upper portion between the lower portion and the intermediate section is not provided with the raised teeth.

In an embodiment, the lower portion of the front section is provided with three separate raised teeth circumferentially, and each raised tooth has a sharp tip and is lower than the first thread in height.

In an embodiment, the front section has three spaced, curved corners, and the three curved corners are staggered from or overlap the three raised teeth at the lower portion of the front section.

In an embodiment, a conical drilling tail with a triangular cross section extends from a lower end of the front section and has three sharp corners. The three sharp corners are aligned with or staggered from the three curved corners of the front section.

In an embodiment, a stem diameter of the intermediate section is greater than a stem diameter of the front section, and a raised outer diameter is defined at the tip of the raised tooth and greater than the stem diameter of the intermediate section. The rear section has circular cross sections, and a stem diameter of the rear section is slightly greater than the stem diameter of the intermediate section.

In an embodiment, a second thread is spirally and circumferentially arranged on the shank and spaced from the first thread. The second thread is formed on the intermediate section of the shank and less than the first thread in a thread height.

The present invention will become clearer in light of the following detailed description of illustrative embodiments of this invention described in connection with the drawings.

DETAILED DESCRIPTION OF THE INVENTION

Figure 9:
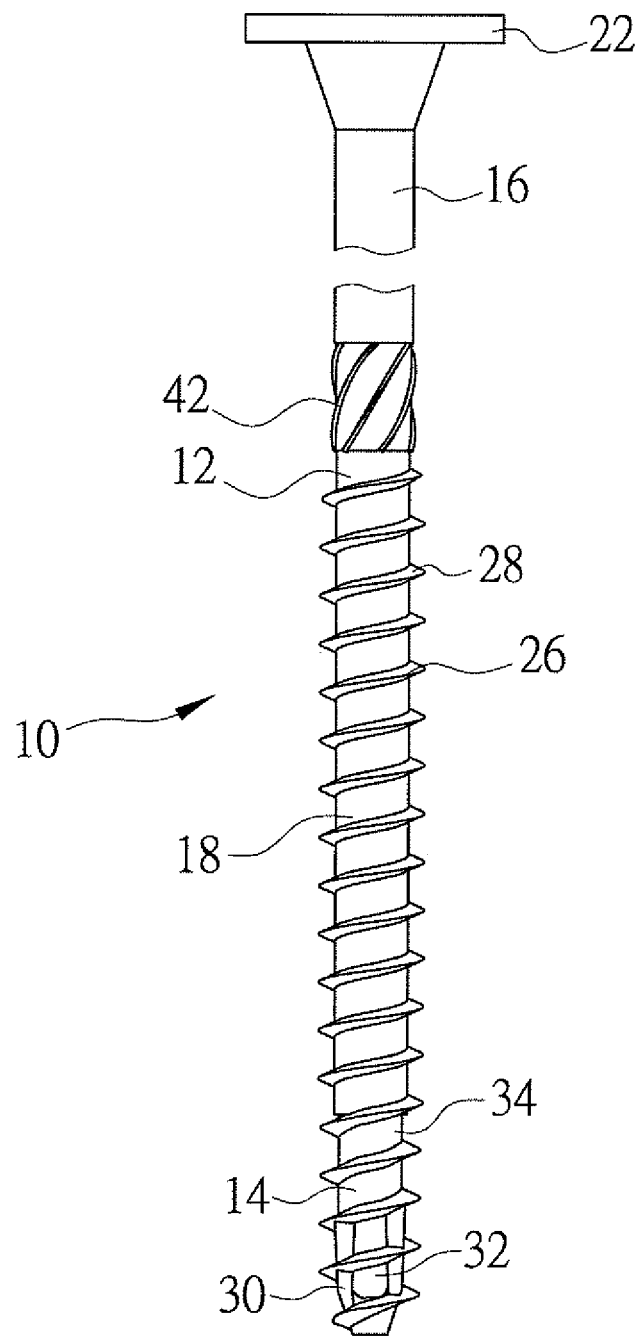
FIG. 9 is a perspective view of a screw with cutting teeth according to a second embodiment of the present invention.

A screw 10 according to a first embodiment of the present invention is shown in FIGS. 1 through 7 of the drawings and includes a shank 12. The shank 12 includes a front section 14, a rear section 16 spaced from the front section 14 along a longitudinal axis (X) of the shank 12, and an intermediate section 18 between the front and rear sections 14 and 16. In this embodiment, a conical drilling tail 20 with a triangular cross section extends from a lower end of the front section 14, so that the screw 10 with the drilling tail 20 is adapted to be driven into wooden workpieces. With no drilling tail extending at the lower end of the front section 14, the screw 10 in FIG. 9 is adapted to be driven into a cement workpiece in which a bore is drilled in advance.

Either the intermediate section 18 or the rear section 16 has circular cross sections, and the rear section 16 has an outer diameter slightly greater than an outer diameter of the intermediate section 18. A head 22 is formed at an upper end of the rear section 16, and a receiving hole 24 is disposed in an upper surface of the head 22 for a screwdriver (not shown) to insert into. The screw 10 further includes a first thread 26 spirally formed on an outer circumference of the shank 12. The first thread 2 includes a plurality of thread convolutions 28, and any two adjacent thread convolutions 28 form a pitch (P). In this embodiment, the first thread 26 has a symmetrical thread profile with a plurality of symmetric thread convolutions 28 and extends from the drilling tail 20 to the intermediate section 18. A thread angle of the first thread 26 may be between 30 and 80 degrees. In this embodiment of FIG. 9, the first thread 26 extends from the front section 14 to the intermediate section 18. In another practicable embodiment, the first thread 26 may extend from the front section 14 to the rear section 16.

Figure 1:
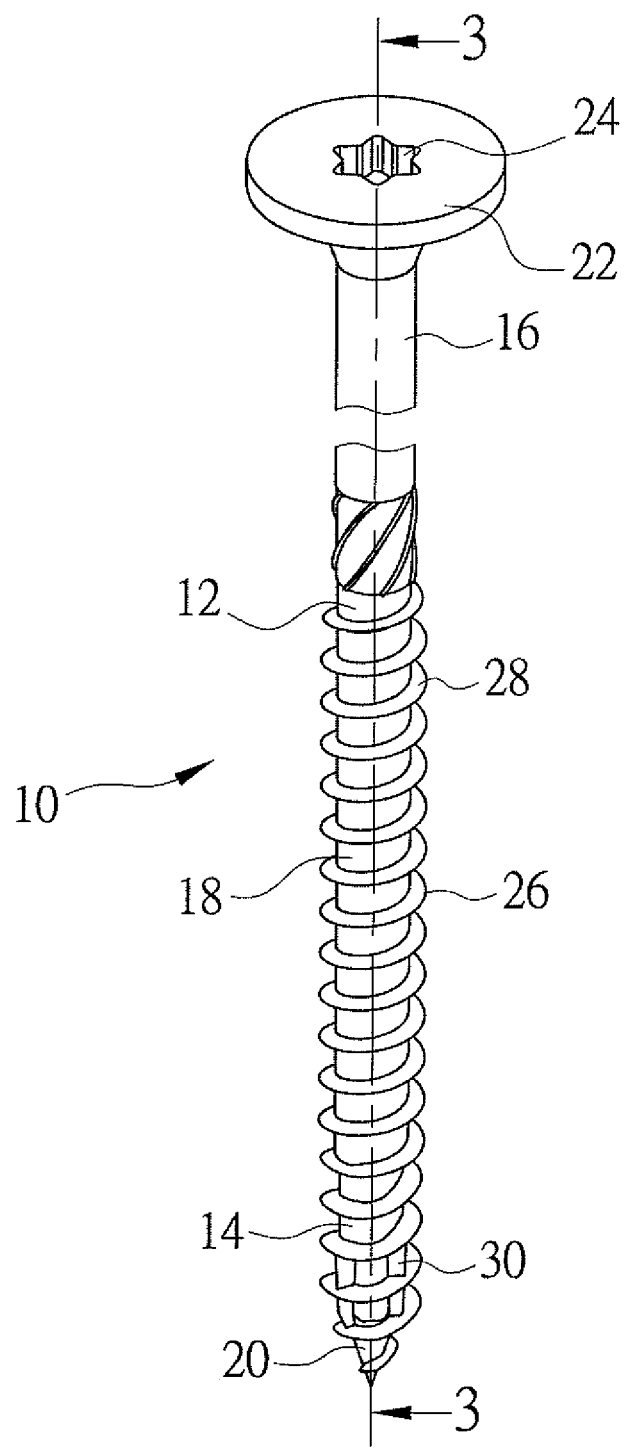
FIG. 1 is a perspective view of a screw with cutting teeth according to a first embodiment of the present invention.
Figure 2:
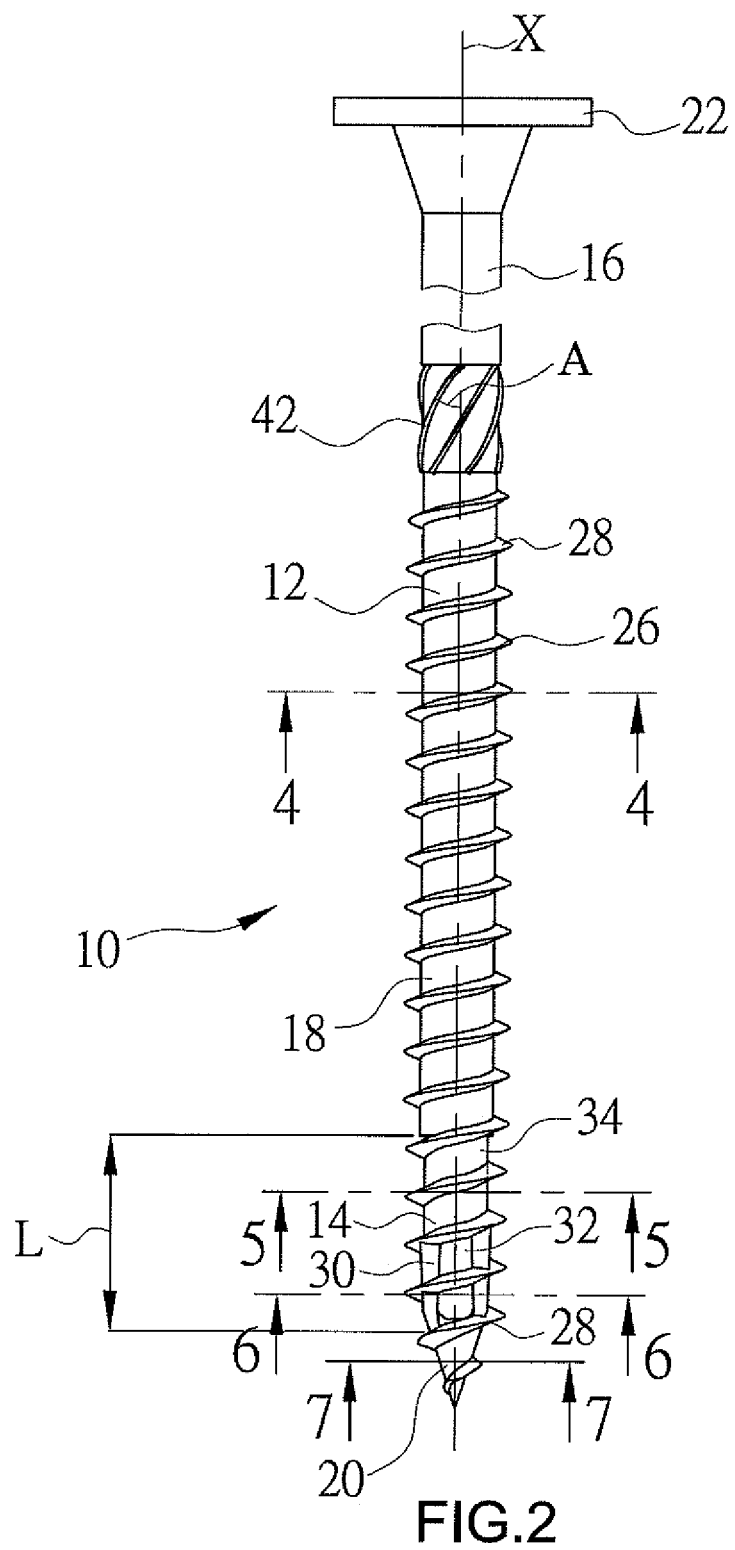
FIG. 2 is a front view of the screw of FIG. 1.
Figure 6:
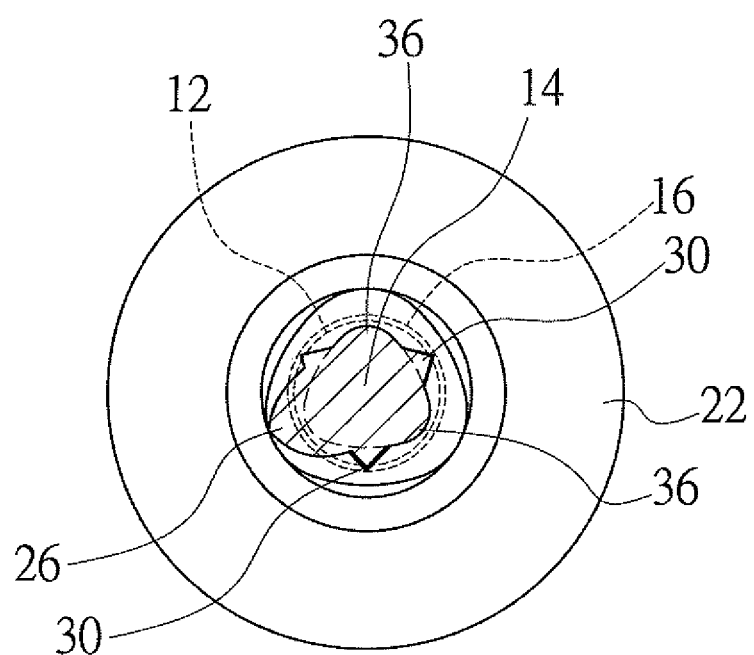
FIG. 6 is a sectional view taken along line 6-6 of FIG. 2.

The screw 10 of the present invention features the front section 14 of the screw 10 having roughly triangular cross sections and provided with a plurality of separate raised teeth 30 circumferentially. Each of the raised teeth 30 protrudes outward from a circumferential surface of the front section 14 and is between two adjacent thread convolutions 28 in the direction of the longitudinal axis (X) and is lower than the first thread 26 in height (FIG. 2). In this embodiment, each raised tooth 30 with a sharp tip is characteristic of a serrate transverse profile (FIG. 6). Furthermore, the front section 14 includes a lower portion 32 next to the drilling tail 20 and an upper portion 34 next to the intermediate section 18. In this embodiment, the front section 14 has a longitudinal length (L) equal to four pitches (P) roughly, and the raised teeth 30 are provided on the lower portion 32 of the front section 14 and extend for roughly two pitches (P) along the longitudinal axis (X). The upper portion 34 between the lower portion 32 and the intermediate section 18 is not provided with a raised tooth and extends for roughly two pitches (P) along the longitudinal axis (X).

Figure 7:
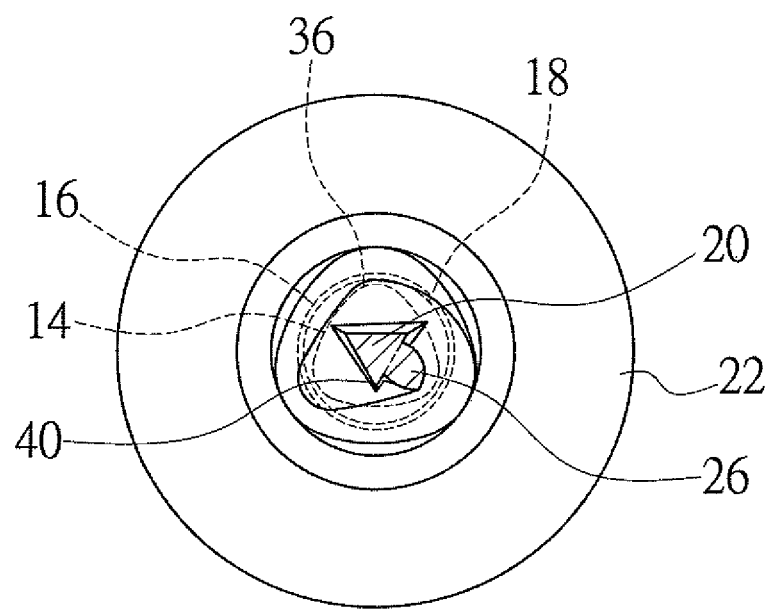
FIG. 7 is a sectional view taken along line 7-7 of FIG. 2.
Figure 8A:
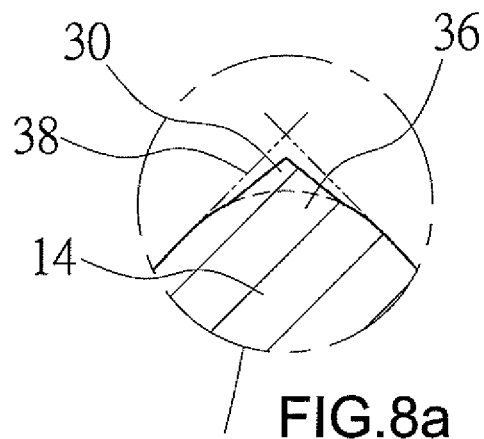
FIG. 8a shows an enlarged view of a circled portion in FIG. 8.
Figure 8:
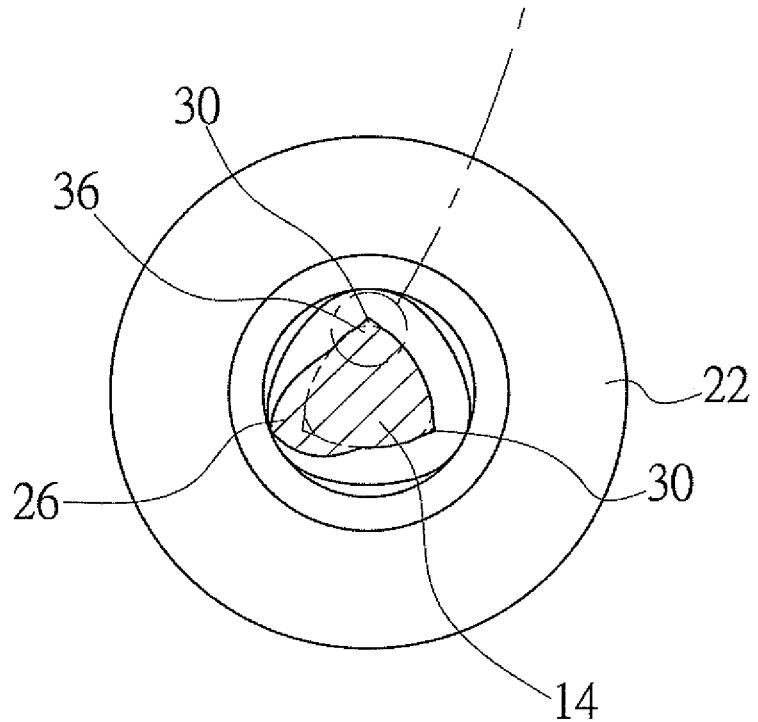
FIG. 8 is a sectional view similar to FIG. 6, illustrating raised teeth of the present invention in another embodiment.

In this embodiment, the front section 14, around its circumference, has three curved corners 36 spaced 120 degrees apart and further has three raised teeth 30 also spaced 120 degrees apart (see FIG. 6). The three raised teeth 30 and the three curved corners 36 are designed as radial arrangement. Namely, the three raised teeth 30 are staggered from the three curved corners 36. In another embodiment, each raised tooth 30 overlaps a corresponding curved corner 36 and is positioned within an area defined by two tangents 38 which extend from the corresponding curved corner 36 (FIGS. 8 and 8a). Furthermore, the drilling tail 20 with triangular cross sections has three sharp corners 40 (FIG. 7). In this embodiment, the three sharp corners 40 are staggered from the three curved corners 36 of the front section 14 circumferentially. However, the three sharp corners 40 of the drilling tail 20 can be aligned with three curved corners 36 of the front section 14 circumferentially in a practicable embodiment.

In this embodiment, the thread convolutions 28 at the intermediate section 18 feature the circular cross section as shown in the intermediate section 18, and the thread convolutions 28 at both the front section 14 and the drilling tail 20 have the triangular cross section as shown in the front section 14 and the drilling tail 20. The stem diameter of the shank 12 increases gradually from the drilling tail 20 to the rear section 16, that is, a stem diameter D1 of the rear section 16 is greater than a stem diameter D2 of the intermediate section 18, the stem diameter D2 of the intermediate section 18 is greater than a stem diameter D3 of the front section 14, and the stem diameter D3 of the front section 14 is greater than a stem diameter of the drilling tail 20. Furthermore, an outer diameter D4 is defined at the tip of the raised tooth 30 on the front section 14 (FIG. 3) and greater than each of the stem diameter D3 of the front section 14 and the stem diameter D2 of the intermediate section 18. As such, contact areas between the driven screw 10 and a workpiece are reduced for less screw-in fiction as well as less damage of a screw's coating layer and better anti-screw-out effect.

Figure 3:
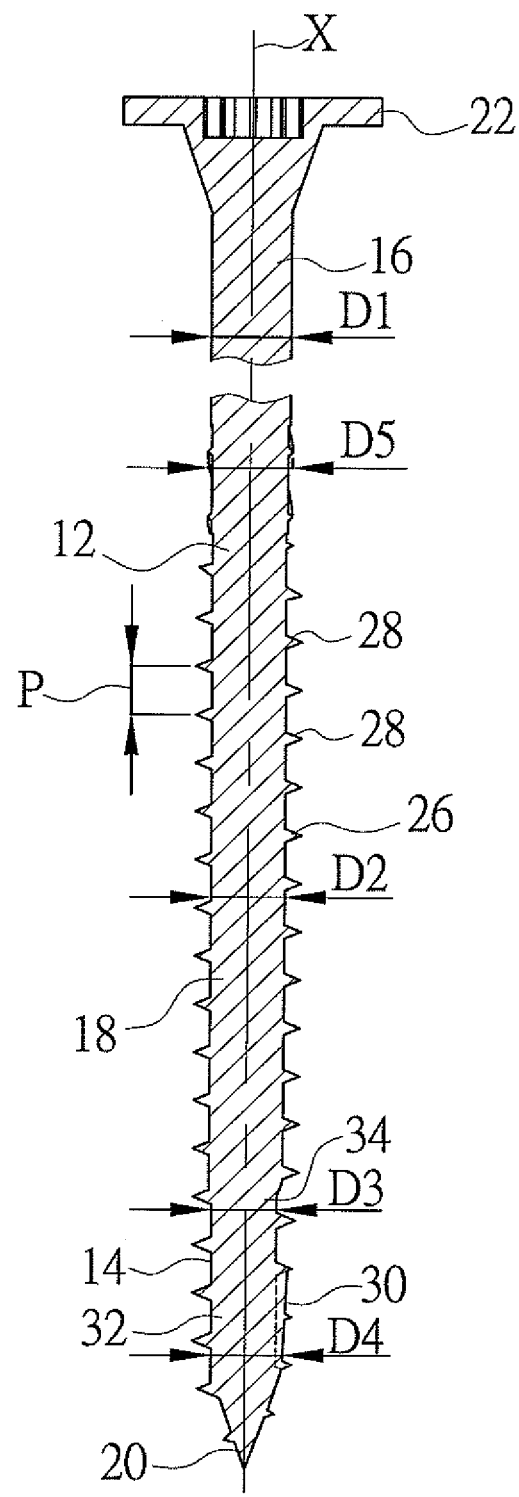
FIG. 3 is a longitudinal sectional view taken along line 3-3 of FIG. 1.
Figure 4:
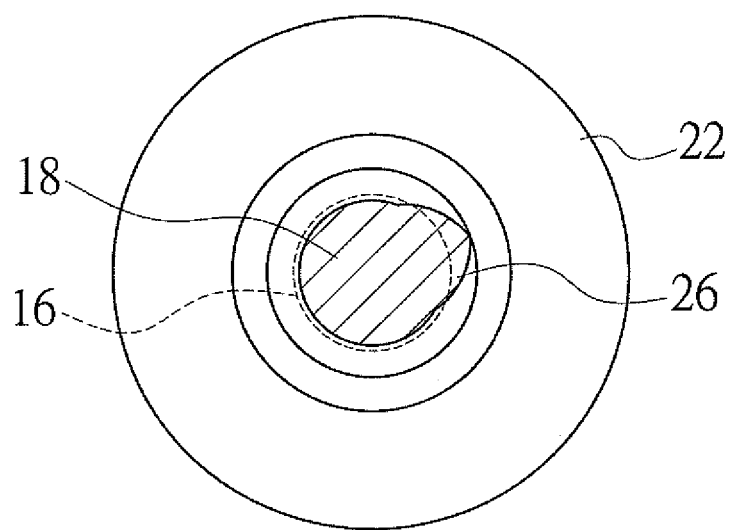
FIG. 4 is a transverse sectional view taken along line 4-4 of FIG. 2.
Figure 5:
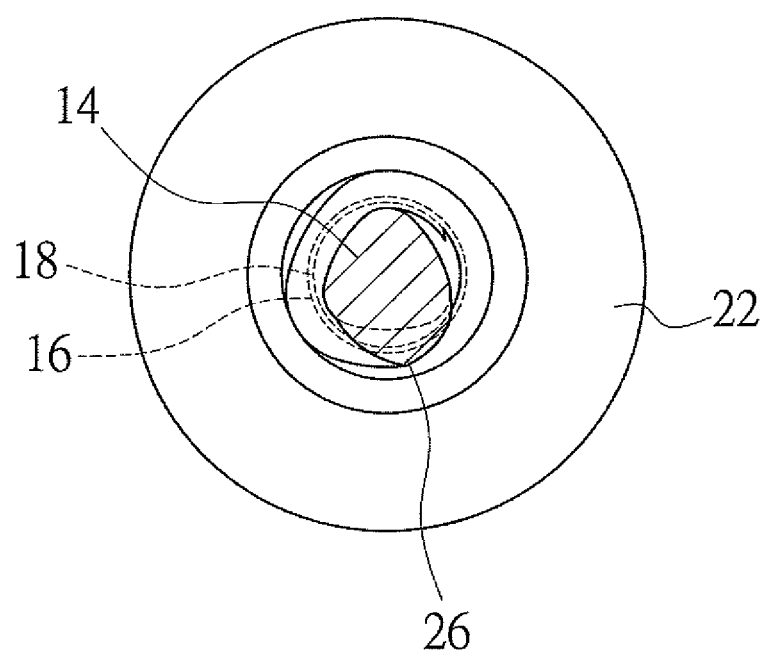
FIG. 5 is a sectional view taken along line 5-5 of FIG. 2.

In this embodiment, a plurality of spaced ribs 42 is provided on the rear section 16 and adjacent to the intermediate section 18. An included angle (A) between each rib 42 and the longitudinal axis (X) is designed to be an angle from 10 to 30 degrees. Referring to FIG. 3, an outer diameter D5 defined by the ribs 42 is greater than the stem diameter D1 of the rear section 16 for easy driving of the rear section 16 into workpieces.

In practice, the screw 10, at the drilling tail 20, is inserted into a wooden workpiece such as a plank and driven with a hand tool or an electric tool (not shown in figures) which is held in the socket 24 in the head 22. Then, a hole is drilled and enlarged in the workpiece by the three sharp corners 40 of the drilling tail 20, and the first thread 26 is driven into the workpiece simultaneously. In the course of drilling and enlarging the hole in the workpiece by the first thread 26, since the front section 14 with the triangular cross sections is not in full contact with the work-piece, the friction resistance of screwing is reduced. Furthermore, the resistance against the screw 10 along the screwing direction can be reduced and a driving speed of the first thread 26 for cutting the workpiece is increased, since the raised teeth 30 around the front section 14 assists the first thread 26 to cut the workpiece. Moreover, debris generated in cutting the workpiece is discharged around the triangular-cross section front section 14 for less resistance as well as neither the screw nor the workpiece broken. Further, when the workpiece is cut by the triangular-cross section front section 14 and further the circular-cross section intermediate section 18 of the screw 10, a buffer area is created by the upper portion 34 on which no raised tooth 30 is designed for smooth driving of the circular-cross section intermediate section 18 of the screw 10 into the workpiece as well as time-efficient and effortless effect. In addition, the workpiece is firmly occluded by and coupled with the screw 10 because of the circular-cross section intermediate section 18 of the screw 10 and the tip of the first thread 26. The above-described effect can also be achieved by the screw 10 of the second embodiment of the present invention (FIG. 9). Specifically, the screw 10 in FIG. 9 driven into a cement workpiece relies on the triangular-cross section front section 14 as well as the raised teeth 30 around the front section 14 for cutting and enlarging a drilled hole.

Figure 10:
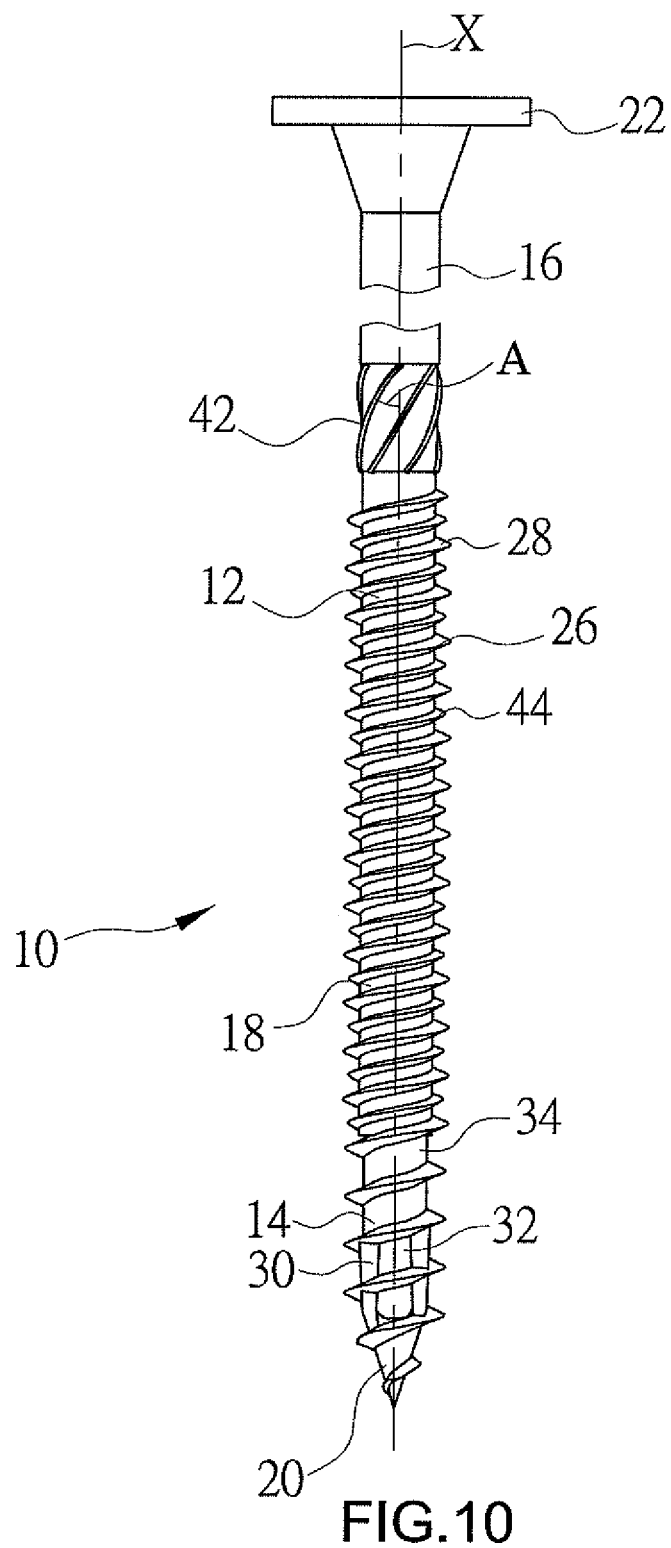
FIG. 10 is a perspective view of a screw with cutting teeth according to a third embodiment of the present invention.

FIG. 10 shows a screw 10 according to a third embodiment of the present invention modified from the first embodiment. In this embodiment, the first thread 26 has an asymmetrical thread profile with a plurality of asymmetric thread convolutions 28 which can enhance the coupling ability of the screw 10 with the workpieces, because it is easy to screw the asymmetric thread convolutions 28 into the workpieces and not easy to unscrew them. The screw 10 further includes a second thread 44 spirally and circumferentially arranged on the shank 12 and spaced from the first thread 26. In this embodiment, the second thread 44 includes a plurality of asymmetrical thread convolutions formed on the intermediate section 18 and is less than the first thread 26 in a thread height for lowered resistance against the screw 10 in the screw-in direction and for a faster driving speed of the screw 10. In addition, the second thread 44 is identical to the first thread 26 in an upward-spin direction and may extend from the intermediate section 18 to the rear section 16, enhancing guiding effect of the screw 10 in the screw-in direction and anchoring strength.

The scope of the invention is to be indicated by the appended claims, rather than by the foregoing description, and all changes which come within the meaning and range of equivalency of the claims are intended to be embraced therein.

The invention claimed is:

1. A screw with cutting teeth comprising:
a shank including a front section, a rear section spaced from the front section along a longitudinal axis of the shank, and an intermediate section between the front and rear sections, with a head formed at an upper end of the rear section, with the intermediate section having circular cross sections, with the front section having roughly triangular cross sections and provided with a plurality of separate raised teeth circumferentially; and
a first thread spirally formed on the shank and including a plurality of thread convolutions, with a pitch defined between two adjacent thread convolutions;
wherein the front section extends for at least two pitches along the longitudinal axis of the shank, with each raised tooth protruding from the front section and located between two adjacent thread convolutions, with each raised tooth extending for at least one pitch along the longitudinal axis, wherein the front section includes an upper portion next to the intermediate section and a lower portion spaced from the upper portion along the longitudinal axis, with the lower portion extending for at least one pitch along the longitudinal axis, with the plurality of raised teeth provided on the lower portion of the front section and not provided on the upper portion between the lower portion and the intermediate section.

2. The screw according to claim 1, wherein the lower portion of the front section is provided with three separate raised teeth circumferentially, with each raised tooth having a sharp tip and being lower than the first thread in height.

3. The screw according to claim 2, wherein the front section has three spaced, curved corners, with the three curved corners staggered from or overlapping the three raised teeth at the front section.

4. The screw according to claim 3, wherein a conical drilling tail with a triangular cross section extends from a lower end of the front section and has three sharp corners, with the three sharp corners aligned with the three curved corners of the front section.

5. The screw according to claim 3, wherein a conical drilling tail with a triangular cross section extends from a lower end of the front section and has three sharp corners, with the three sharp corners staggered from the three raised teeth at the front section.

6. The screw according to claim 2, wherein a stem diameter of the intermediate section is greater than a stem diameter of the front section, with an outer diameter defined at the tip of the raised tooth and being greater than the stem diameter of the intermediate section.

7. The screw according to claim 6, wherein the rear section has circular cross sections, with a stem diameter of the rear section being slightly greater than the stem diameter of the intermediate section.

8. The screw according to claim 7, wherein a plurality of spaced ribs is provided on the rear section and adjacent to the intermediate section, with an included angle between each rib and the longitudinal axis being between 10 and 30 degrees.

9. The screw according to claim 1, wherein the first thread has a symmetrical thread profile with a plurality of symmetric thread convolutions.

10. The screw according to claim 1, wherein the first thread has an asymmetrical thread profile with a plurality of asymmetric thread convolutions.

11. The screw according to claim 1, wherein a second thread is spirally and circumferentially arranged on the intermediate section of the shank and spaced from the first thread, with the second thread being less than the first thread in a thread height.

12. A screw with cutting teeth comprising:
a shank including a front section, a rear section spaced from the front section along a longitudinal axis of the shank, and an intermediate section between the front and rear sections, with a head formed at an upper end of the rear section, with the intermediate section having circular cross sections, with the front section having roughly triangular cross sections and provided with a plurality of separate raised teeth circumferentially; and
a first thread spirally formed on the shank and including a plurality of thread convolutions, with a pitch defined between two adjacent thread convolutions;
wherein the front section extends for at least two pitches along the longitudinal axis of the shank, with each raised tooth protruding from the front section and located between two adjacent thread convolutions, with each raised tooth extending for at least one pitch along the longitudinal axis,
wherein a stem diameter of the intermediate section is greater than a stem diameter of the front section, with each raised tooth having a tip, with an outer diameter defined at the tip of the raised tooth and being greater than the stem diameter of the intermediate section.

13. The screw according to claim 12, wherein the rear section has circular cross sections, with a stem diameter of the rear section being slightly greater than the stem diameter of the intermediate section.

14. The screw according to claim 13, wherein a plurality of spaced ribs is provided on the rear section and adjacent to the intermediate section, with an included angle between each rib and the longitudinal axis being between 10 and 30 degrees.

* * * * *